United States Patent
Mueller et al.

[11] Patent Number: 6,122,958
[45] Date of Patent: Sep. 26, 2000

[54] ELECTROMAGNETICALLY CONTROLLED MEASURING APPARATUS FOR THE VOLUMETRIC MEASUREMENT OF THE AMOUNT OF FUEL INJECTED BY A FUEL-INJECTION PUMP

[75] Inventors: Manfred Mueller; Claus Stenger, both of Stuttgart; Gebhard Ilg, Waiblingen, all of Germany

[73] Assignee: DaimlerChrysler AG, Stuttgart, Germany

[21] Appl. No.: 09/114,151

[22] Filed: Jul. 13, 1998

[30] Foreign Application Priority Data

Jul. 12, 1997 [DE] Germany .............................. 197 29 892

[51] Int. Cl.⁷ .................................................. G01M 15/00
[52] U.S. Cl. ................................... 73/119 A; 324/207.18; 73/118.1; 123/617; 701/103
[58] Field of Search ........................ 324/207.18, 207.19, 324/207.22, 207.24; 336/45; 73/119 A, 232; 701/103; 123/322

[56] References Cited

U.S. PATENT DOCUMENTS 3,108,213  10/1963  Golder et al. ...................... 324/207.18

FOREIGN PATENT DOCUMENTS

| 083064 | of 1990 | European Pat. Off. . |
| 3343269C1 | of 1983 | Germany . |
| 3916419A1 | of 1990 | Germany . |
| 3916419 | 11/1990 | Germany . |
| 223101 | 5/1990 | United Kingdom . |

Primary Examiner—Hezron Williams
Assistant Examiner—Anthony Jolly
Attorney, Agent, or Firm—Evenson, McKeown, Edwards & Lenahan, P.L.L.C.

[57] ABSTRACT

The invention relates to an electromagnetically controlled measuring apparatus for the volumetric measurement of the quantity of fuel injected by a fuel injection pump that has a displacement transducer which is surrounded by cooling chambers. The apparatus also includes a differential coil pair and a magnetically conductive core, which can be guided axially therein. The coil and the conductive core constitute part of a lifting rod connected to a measuring piston, with a coil carrier and a housing surrounding the coil carrier. The magnetically conductive core consisting of a ferritic material and being firmly surrounded by a sleeve, which forms the lifting rod, is not magnetizable and is provided with a slot extending continuously in the longitudinal direction of the sleeve.

14 Claims, 2 Drawing Sheets

ELECTROMAGNETICALLY CONTROLLED MEASURING APPARATUS FOR THE VOLUMETRIC MEASUREMENT OF THE AMOUNT OF FUEL INJECTED BY A FUEL-INJECTION PUMP

BACKGROUND AND SUMMARY OF THE INVENTION

This application claims the priority of German Patent No. 197 298 92.3, filed Jul. 12, 1997, the disclosure of which is expressly incorporated by reference herein.

The invention relates to an electromagnetically-controlled measuring apparatus for the volumetric measurement of the quantity of fuel injected by a fuel-injection pump that has a displacement transducer which is surrounded by cooling chambers. The apparatus also includes a differential coil pair and a magnetically conductive core, which can be guided axially in the cooling chambers. The coil and the conductive core constitute part of a lifting rod connected to a measuring piston, with a coil carrier and a housing surrounding the coil carrier.

Such a measuring apparatus is known from German patent document DE 39 16 419 C2. This measuring apparatus essentially consists of a measuring piston, which is acted upon by gas pressure. A lifting rod is guided in a measuring cylinder and separates a measurement chamber from the gas pressure chamber. Additionally, the apparatus has a displacement transducer which is surrounded by cooling chambers and soldered to the lifting rod, and a differential pair of coils and a magnetically conductive core (a ferromagnetic iron core) which can be shifted axially therein.

When the quantity of injected fuel is measured with this measuring apparatus, which is intended for use with diesel injection systems, the linearity of the displacement transducer and the independence of the scale factor from the temperature must satisfy high requirements. However, in the case of injection systems, the sensitivity of the displacement transducer unavoidably changes as a function of the temperature. This is because these systems are operated at high and varying pressures, that is, direct injection systems such as systems working according to the common rail principle. With such systems, the temperature of the fuels, which are injected under high pressure, changes very rapidly with the respective pressure.

It is an object of the invention to further increase the accuracy of the measurement by the piston of the generic measuring apparatus. In addition, the measuring apparatus shall be particularly suitable for injection systems, which are operated at high pressures, such as common rail systems.

This and other objects and advantages are achieved by the electromagnetically-controlled measuring apparatus according to the invention, in which eddy currents are suppressed by using a ferritic material for the magnetically conductive core, and by using a lifting rod as a sleeve which cannot be magnetized. This sleeve tightly surrounds the ferritic core and is provided with a continuous slot for interrupting the circular current paths. In addition, in order to avoid eddy currents, the housing which surrounds the coil carrier is also made of a ferritic material or a non-magnetic material. The sleeve is equipped with numerous longitudinal grooves, which open toward the coil carrier and accommodate ferritic rods. As a result, the temperature dependence of the scale factor is reduced to the desired extent which yields a higher measuring accuracy.

Moreover, the measurement is more precise due to both displacement transducer coils being divided into three sections. In each case, the outer section is carefully wound from winding to winding, with a high number of layers.

In an embodiment according to the invention, only the middle section of the transducer coil is wound with a low number of layers.

In still another embodiment according to the invention, to achieve an extremely good linearity, only the length of the core is optimized.

Other objects, advantages and novel features of the present invention will become apparent from the following detailed description of the invention when considered in conjunction with the accompanying drawings.

DETAILED DESCRIPTION OF THE DRAWINGS

Figure 1:
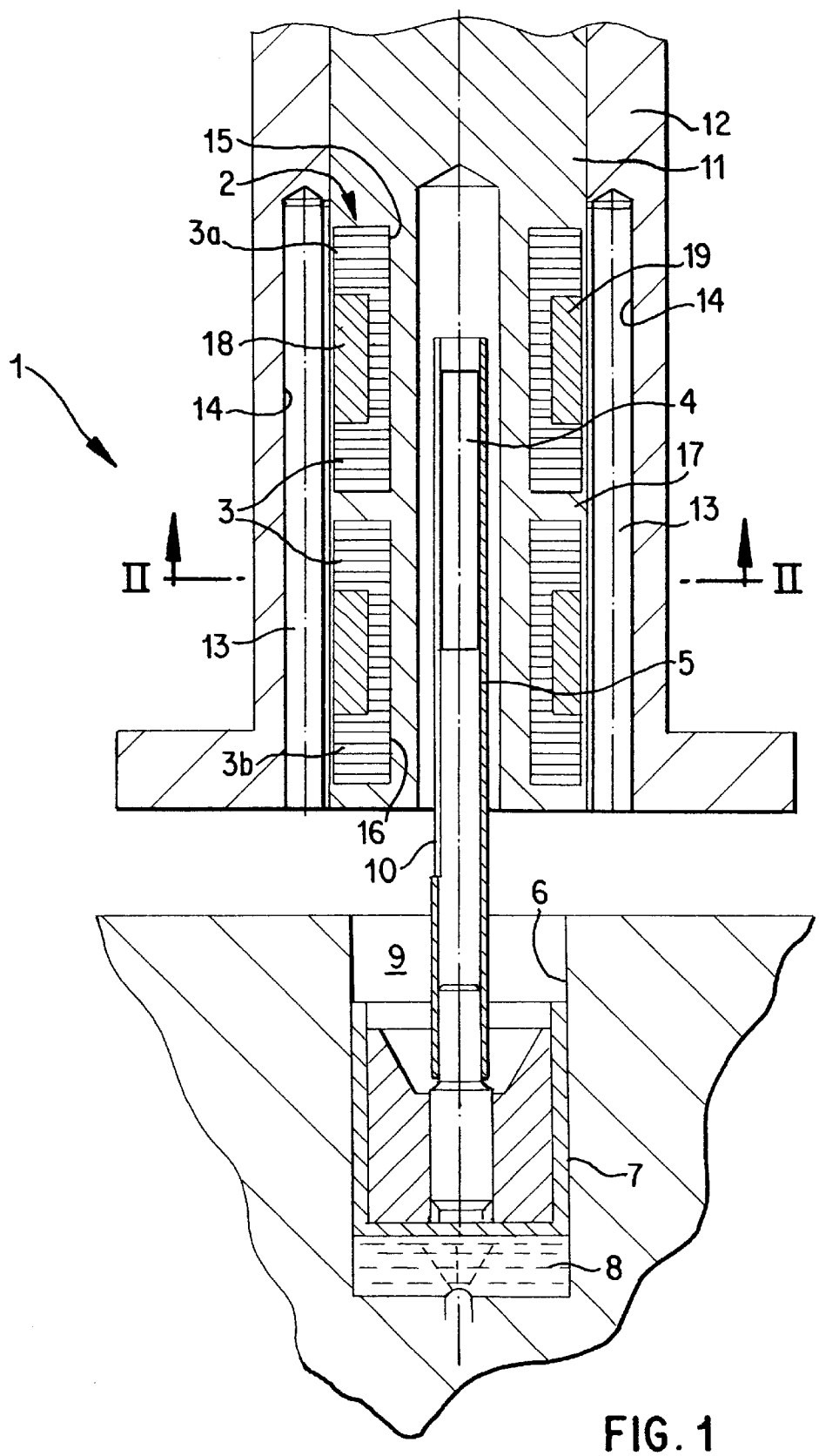
FIG. 1 shows the upper part of an inventive measuring apparatus in longitudinal section along the line I—I of FIG. 2.

According to FIG. 1, an electromagnetically controlled measuring apparatus 1 for volumetrically measuring the quantity of fuel injected by a high pressure pump, the details of which are not shown, for pumping the fuel under very high pressure (up to about 2000 bar) comprises, an inductive displacement transducer 2 with a differential coil pair 3, as well as a ferritic core 4, which can be shifted axially therein. The ferritic core 4 consists of sintered ceramic powder, through which current cannot flow. Since this material is very brittle and fragile, the ferritic core 4 is firmly enclosed by a sleeve 5 (which is not magnetizable), and glued over its whole length into the sleeve 5. The sleeve 5 serves as a holder for the core 4.

The sleeve 5 which acts as a holder, is at the same time a lifting rod and is firmly connected with a measuring piston 7. The piston 7 is guided in a measuring cylinder 6 and is acted upon by gas pressure. The piston 7 also separates a measuring chamber 8 from a gas pressure chamber 9.

The sleeve 5 (which may be a small, non-magnetic steel pipe made from Inconel), is slotted in its longitudinal direction in order to avoid eddy currents. The slot 10 extends at least over the entire length of the differential coil pair 3.

A coil carrier 11, consisting of plastic, accommodates the differential coil pair 3 and surrounds the sleeve 5 with little clearance. The coil carrier 11 is seated firmly in a cylindrically constructed housing 12.

In order to avoid having to make specially pressed parts of ferrite for the housing 12, the latter, which not only must accommodate the displacement transducer 2, but also must be sealed against up to 100 bar nitrogen, is to be made from a non-ferromagnetic metal, such as brass. Furthermore, only a number of ferrite cores, in the form of extended rods 13, are to be used. These extended rods 13 are glued into the longitudinal grooves 14 of the housing 12. The longitudinal grooves 14 are arranged so that their open side is directed toward the coils 3a, 3b of the coil carrier 11. This arrangement is for the avoidance of eddy currents in the metal body.

Figure 2:
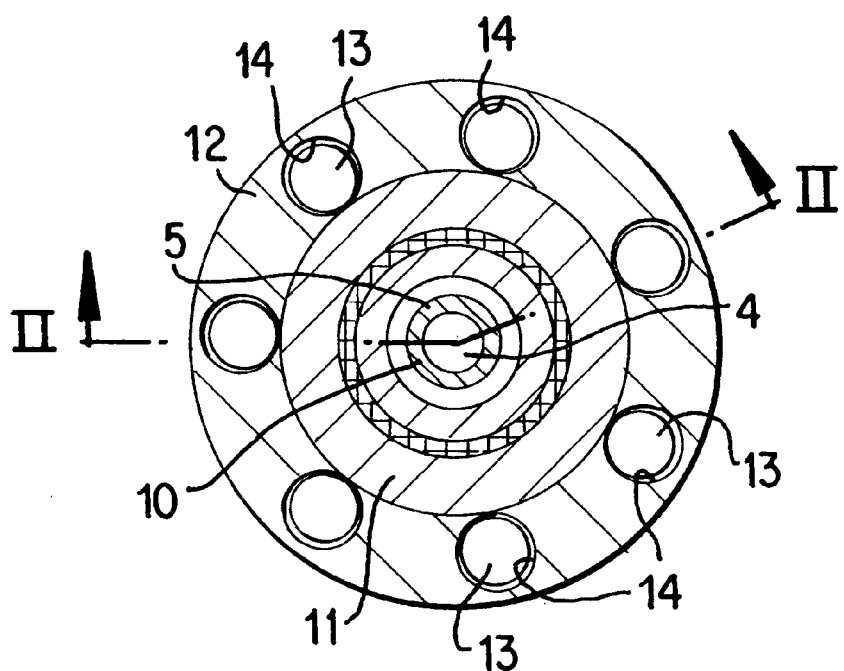
FIG. 2 shows a section through the upper part of the measuring apparatus along the line II—II of FIG. 1.

As shown in FIG. 2, the longitudinal grooves 14, with the inserted rods 13, extend over the entire length of the differential coil pair 3, and are distributed uniformly about the periphery of the housing 12. The number of grooves may, for example, be six to eight; in the example, seven ferritic rods 13 are arranged.

Two annular recesses 15 and 16, for accommodating the coils 3a, 3b of the differential coil pair 3, are incorporated in the coil carrier 11. The coils are separated from one another by an external collar 17 at the coil carrier 11. The lower three layers of the two coils 3a, 3b are wound carefully, from winding to winding. A precisely manufactured plastic body 18, 19 is clipped longitudinally in the center of the coils and fixed in its defined position. In each case, next to these two centrally lying plastic bodies 18 and 19, the central coil sections on the outside are filled with further layers or windings, the nominal wire diameter being, for example, 0.09 mm.

Here, the length and the number of layers and windings of the sections are matched to one another such that, in the required range of travel of the displacement transducer 2, the desired high degree of linearity can be achieved by optimizing the core length.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electromagnetically controlled measuring apparatus for the volumetric measurement of a quantity of fuel injected by a fuel injection pump, comprising:

a displacement transducer having a differential coil pair and a magnetically conductive core formed of a ferritic material and disposed and guided axially in the displacement transducer;

a sleeve which surrounds the magnetically conductive core, said sleeve and core forming a lifting rod;

a measuring piston connected to the lifting rod;

a coil carrier surrounding the lifting rod;

a housing surrounding the coil carrier; and wherein said lifting rod has a slot extending continuously in the longitudinal direction of the sleeve.

2. The measuring apparatus of claim 1, wherein the coil carrier surrounding the lifting rod is comprised of plastic, the housing surrounding the coil carrier has longitudinal grooves which open toward the coil carrier and a plurality of rods fixedly inserted therein, and said plurality of rods are at least as long as the differential coil pair.

3. The measuring apparatus of claims 2, wherein the plurality of rods are comprised of a ferritic material and are equi-distantly disposed in a circumferential direction around the housing.

4. The measuring apparatus of claim 3, wherein the housing is cylindrical and non magnetizable.

5. The measuring apparatus of claim 1, further comprising:

mutually coaxial coils each having at least three precisely wound layers; and position-fixing plastic parts clipped onto the layers in the longitudinal central region of the respective coils;

wherein approximately five further layers disposed on an outside center are wound next to the plastic parts.

6. The measuring apparatus of claim 1, wherein a length of the axially guided magnetically conductive core is determinable by repeatedly measuring a characteristic displacement line with cores having different lengths.

7. The measuring apparatus of claim 1, wherein the lifting rod is a sleeve surrounding the magnetically conductive core.

8. An electromagnetically controlled measuring apparatus, comprising:

a displacement transducer having a differential coil pair;

a lifting rod having a continuously longitudinally extending slot and a magnetically conductive core disposed and guided axially in the displacement transducer;

a measuring piston connected to the lifting rod;

a coil carrier surrounding the lifting rod; and a housing surrounding the coil carrier.

9. The measuring apparatus of claim 8, wherein the coil carrier surrounding the lifting rod is comprised of plastic, the housing surrounding the coil carrier has longitudinal grooves which open toward the coil carrier and a plurality of rods fixedly inserted therein, and said plurality of rods are at least as long as the differential coil pair.

10. The measuring apparatus of claims 9, wherein the rods are comprised of a ferritic material and are equidistantly disposed in a circumferential direction around the housing.

11. The measuring apparatus of claim 10, wherein the housing is cylindrical and non magnetizable.

12. The measuring apparatus of claim 8, further comprising:

mutually coaxial coils each having at least three precisely wound layers; and position-fixing plastic parts clipped onto the layers in the longitudinal central region of the respective coils;

wherein approximately five further layers disposed on an outside center are wound next to the plastic parts.

13. The measuring apparatus of claim 8, wherein a length of the axially guided magnetically conductive core is determinable by repeatedly measuring a characteristic displacement line with cores having different lengths.

14. The measuring apparatus of claim 8, wherein the lifting rod is a non magnetic sleeve surrounding the magnetically conductive core.

* * * * *